United States Patent [19]
Valkanas

[11] Patent Number: 5,626,638
[45] Date of Patent: May 6, 1997

[54] GASIFICATION OF LOW CALORIFIC VALUE SOLID FUELS TO PRODUCE ELECTRIC ENERGY

[75] Inventor: George N. Valkanas, Maroussi, Greece

[73] Assignee: Biokat Corporation, Athens, Greece

[21] Appl. No.: 379,667

[22] PCT Filed: Jun. 3, 1994

[86] PCT No.: PCT/GR94/00011

§ 371 Date: Feb. 6, 1995

§ 102(e) Date: Feb. 6, 1995

[87] PCT Pub. No.: WO94/29410

PCT Pub. Date: Dec. 22, 1994

[51] Int. Cl.[6] .................. C10J 3/46; C10J 3/60
[52] U.S. Cl. ................... 48/197 R; 48/209; 60/39.02; 60/39.12; 60/39.182; 423/574.1
[58] Field of Search .................. 48/197 R, 203, 48/206, 209; 60/39.02, 39.12, 39.182; 423/574.1

[56] References Cited

U.S. PATENT DOCUMENTS

| | | | |
|---|---|---|---|
| 2,579,398 | 12/1951 | Roetheli | 48/206 |
| 2,633,416 | 3/1953 | Gornowski et al. | 48/203 |
| 2,743,217 | 4/1956 | Silsby | 48/206 |
| 3,447,903 | 6/1969 | Wiewiorowski | 423/574.1 |
| 3,798,308 | 3/1974 | Tatterson | 423/574.1 |
| 3,873,845 | 3/1975 | Osthaus | 60/39.182 |
| 3,991,557 | 11/1976 | Donath | 60/39.182 |
| 4,309,197 | 1/1982 | Chukhanov et al. | 48/197 R |
| 4,322,222 | 3/1982 | Sass | |
| 4,372,756 | 2/1983 | Whitten et al. | 48/203 |
| 4,459,136 | 7/1984 | Linneborn et al. | 48/203 |
| 4,497,637 | 2/1985 | Purdy et al. | 48/209 |
| 4,689,949 | 9/1987 | Kashiwazaki et al. | 60/39.12 |
| 4,927,430 | 5/1990 | Calderon | |
| 4,963,513 | 10/1990 | Marten | 48/203 |
| 5,253,469 | 10/1993 | Hodrien | 60/39.02 |
| 5,290,327 | 3/1994 | Rossle | 60/39.12 |

FOREIGN PATENT DOCUMENTS

| | | | |
|---|---|---|---|
| 0523815 | 3/1993 | European Pat. Off. | |
| 2567143 | 1/1986 | France | |
| 3048215 | 7/1982 | Germany | 48/209 |
| 3048350 | 7/1982 | Germany | 48/209 |
| 8580032 | 1/1961 | United Kingdom | |
| 1479257 | 7/1977 | United Kingdom | |
| 1570002 | 6/1980 | United Kingdom | |
| 2068014 | 8/1981 | United Kingdom | 48/206 |
| 8002563 | 11/1980 | WIPO | |

*Primary Examiner*—Nina Bhat
*Attorney, Agent, or Firm*—Ladas & Parry

[57] ABSTRACT

A process for producing fuel gases from a solid fuel including carbonaceous material and having a calorific value of between about 800 to 3,000 Kcal/Kg. The process includes a) pyrolyzing the solid fuel under reaction conditions and for a time sufficient to pyrolyze about 40–80% of the carbonaceous material whereby to form a first gas and a carbon residue without formation of tar, and b) gasifying carbon residue to form a second gas by heating the carbon residue in the presence of oxygen or oxygen-steam; or burning the carbon residue. In a preferred embodiment, the first and second gases are mixed under conditions to neutralize contained sulfur gases by a Claus reaction.

18 Claims, 1 Drawing Sheet

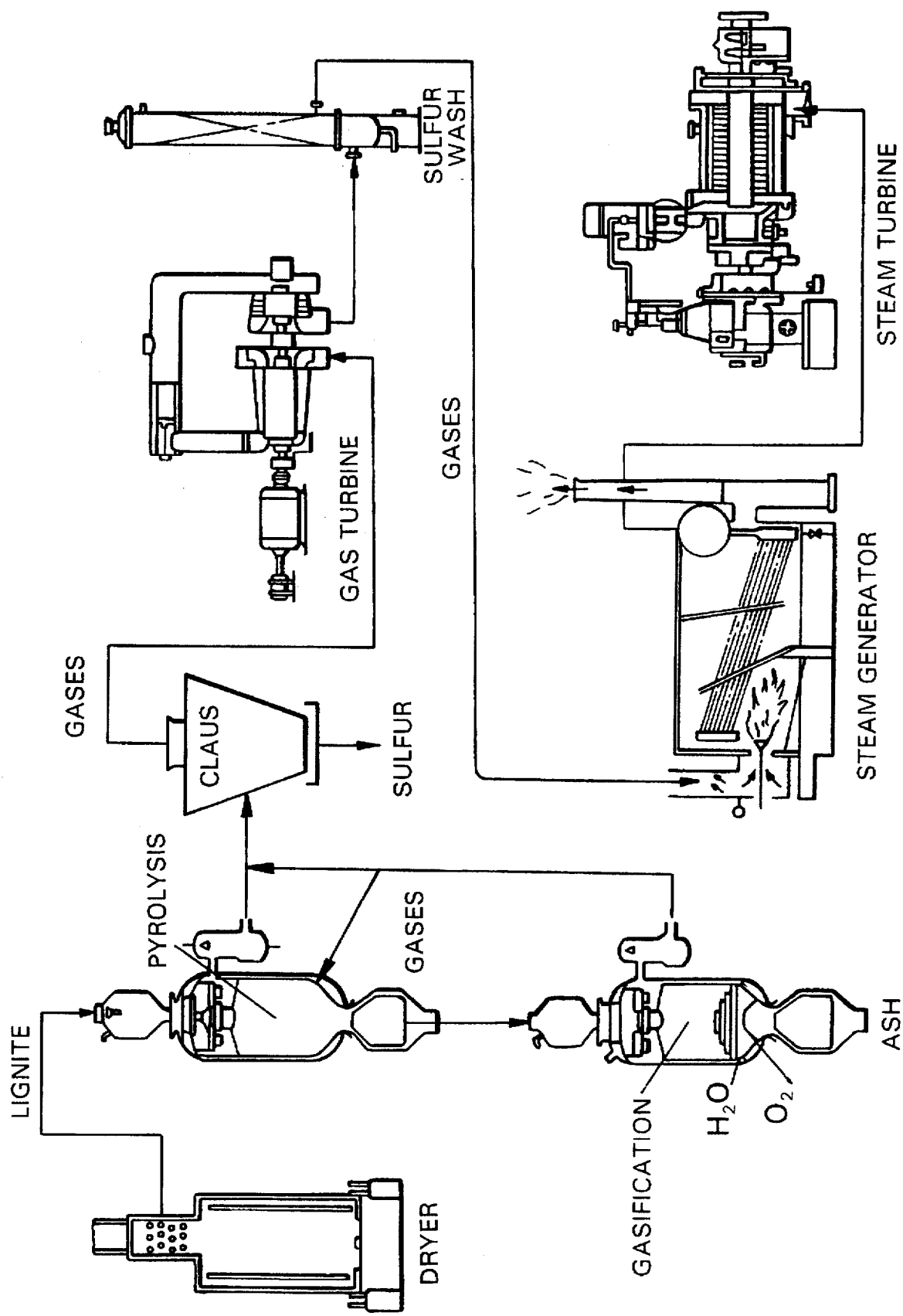

GASIFICATION OF LOW CALORIFIC VALUE SOLID FUELS TO PRODUCE ELECTRIC ENERGY

This application is a 371 of PCT/GR94/00011 filed Jun. 3, 1994.

FIELD OF INVENTION

The invention describes an original gasification method of low calorific value solid fuels e.g. lignites and peats with pyrolysis and oxygen or oxygen-steam gasification in two stages. Additionally it describes an original process by which the gases produced are utilised a Co-Gas advanced system for producing high amounts of electric energy in an operation running without environmental pollution.

BACKGROUND OF INVENTION

With the existing crisis in securing adequate amounts of energy and since petroleum supplies are not regular in availability and price, the national programs for producing electric energy rather prefer to develop local energy sources. In this preferred development, coal is the main source to consider which is the first fuel to be used in power production and is more abundant and more regularly distributed in the World than oil. The resources in coal are divided in low and high thermal value. They are also divided according to their sulfur content which by burning the solid fuels becomes sulfur dioxide creating toxic environmental pollution. With that problem, the utilization of solid fuels is restricted to those containing low sulfur and create as low as possible environmental damage.

In relation to coal and to its utilization in the production of electric energy it is observed that by its burning, the result in electric energy is low, it releases high amounts of sulfur dioxide, fly ash and nitric oxides and it creates high corrosion in the equipment.

Additionally, by burning solid fuels high amounts of carbon dioxide are produced which today are considered a major pollution factor, being the main source for the greenhouse conditions emerging in our Planet. And all these environmental and production problems appear more critical by the use of solid fuels of low calorific values such as lignites and peats.

To face these problems today there exist solutions leading to the reduction of the sulfur content in those low calorific fuels and to the neutralization of the combustion gases.

Those solutions, however, are costly and the corrections offered, because of cost, do not make them attractive. A better approach appears to be the gasification of those low calorific fuels as an action attractive today in spite of its leading to high losses of energy. With total gasification the gases can be washed to separate them from the toxic gases and the flying ash but with total gasification the thermal value is further reduced to 65–70% and expensive industrial installations are needed in the operation.

In the meantime, however, with the development of gas turbines in the production of power more economical solutions are available to utilize gases. Our original solution is such a method which utilizes the fuel gases produced in Co-Gas advanced systems by which the degree of produced electric energy with the use of air turbines and combined cycle is improved. For operating the gas turbines, however, we need fuel gases free of corrosives and free of tars and liquid byproducts, but also of the highest possible thermal value.

SUMMARY OF INVENTION

Considering those developments, the technological characteristics of lignites and peats of low calorific value have been studied and it has been discovered that those solid fuels either as they are received or after deashing (described in another invention) show high efficiency in running in such an advanced system for producing electric energy because those fuels are pyrolyzed at high extent (40–85%), highly exothermally without forming tars and liquid byproducts. The pyrolysis of those low calorific value fuels is optimized at 400°–600° C., and the pyrolytic treatment is highly exothermic in character. The pyrolysis residue is received in high carbon purity with thermal value of 4.000–6.000 Kcal/Kg without ash, or with 2.200–4000 Kcal/Kg with ash. It has been studied for the described invention the gasification of that carbon residue with oxygen and preferably with oxygen-steam and has been discovered that the fuel gases produced are of extremely high thermal value and received at high temperatures of 900°–1.000° C. and that the gasification achieves the complete utilization of carbon. According to this procedure it has been discovered for the said invention that the two-stage gasification of lignites and peats achieves a very high thermal efficiency, and the oxidative gasification does not lead to tars or liquid byproducts.

It has been discovered for the present invention that the pyrolytic treatment proceeds exothermally producing 350–600 Kcal/Kg at 600° C. and the exothermic output in energy is related to the degree of pyrolysis. To that quantity of energy is added the thermal content of the fuel gases and the thermal exchange of the bottom ash and the fuel gases produced in the oxidative gasification.

More heating needs can be adopted on the incoming solid fuels as shown in diagram 1. Thus, the conditions by which the thermal balance of the pyrolytic treatment is covered without using carbon thermal energy have been also studied. And this leads to high energy economy and to high energy utilization of the low calorific solid fuels.

The two stages of gasification, the pyrolysis treatment and the gasification proper (with oxygen or with oxygen-steam) have been discovered in the present invention beneficially to lead to products of different chemical character. Pyrolysis is a reductive treatment in which sulfur is gasified as hydrogen sulfide and the oxidative treatment is oxidative in chemical character in which sulfur is gasified as sulfur dioxide. The inventor has discovered a solution for neutralizing the respective sulfur gases by creating conditions to run the fuel gases to a Claus reactor. With mixing those fuel streams, after first utilization of their thermomechanical energy in a turbine system, with temperatures of 600° C. and at a pressure of 30 at, and feeding them to a Claus catalytic reactor the sulfur gases release product sulfur $$2H_2S + SO_2 \rightarrow 3S + 2OH_2$$

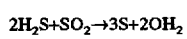

That possibility to neutralize the sulfur gases beneficially simply with production of valuable sulfur is a main advantage of the invention. It satisfies a goal for R & D activity: to develop a method of producing electric energy from low calorific value solid fuels which does not create toxic pollution problems from sulfur dioxide and from flying ash. The derived sulfur is collected in high purity and may in small amounts be taken with the gases flow from where it is washed with water and collected.

Another advantage of the invention is that the fuel gases are received to pressures of 30 at. developed during the pyrolytic treatment and form a working pressure in the two gasification treatments and in the Claus unit. The fuel gases are received at temperatures of 600° to 900° C. and at pressure 30 at., free of corrosive substances and sulfur gases.

Another basic advantage of the invention is the experimentally proved evidence that the low calorific value solid fuels (lignites and peats) are pyrolyzed exothermally because of the oxygen content of the organic materials, which resemble wood.

BRIEF DESCRIPTION OF THE DRAWING

The drawing is a diagrammatic representation of the gasification and utilization of lignites and peats according to a preferred embodiment of the claimed method.

DETAILED DESCRIPTION

Wood and woody biomass are known to pyrolyze exothermally at temperatures higher than 400° C. and that has been utilized beneficially in the past for the distillation treatment of wood and recently in the pyrolytic treatment of garbage biomass. The low calorific value solid fuels (lignites and peats) have the following woody consistency.

TABLE 1

| The consistency of Lignites and Peats | | |
|---|---|---|
| Constituents | Lignites | Peats |
| pH | 5.8–6.9 | 4.6–5.4 |
| Ash | 15–35 | 6–20.5 |
| Waxy substances etc. | 5.2–6.8 | 8.1–8.3 |
| Humic acids | 20–33.8 | 18–34.1 |
| Humins | 30–40 | 37–42.1 |
| Holocellulose | 31–35 | 26.1–32.9 |
| d-cellulose | 8–15 | 10.5–12.0 |

With the above which determine the nature of the pyrolytic tendency and the result of the gasification with oxygen or with oxygen and steam a system is formed with profitable thermal balance in thermal exchanges and final results. The thermal operational parameters determine:

a. That the heating of the solid fuels to the pyrolytic treatment is affected by the rejected thermal energy, that is thermal energy from off-gases, bottom ash, etc.

b. That the pyrolytic gasification is exothermic, producing 250–600 Kcal/Kg thermal energy with formation of operational pressures up to 30 atm. and it is advanced without being influenced by moisture or ash presence and it is a reaction of reductive chemical character.

c. That the Claus reaction of neutralizing the sulfur gases is spontaneous at temperatures 600° C. and at pressures of 30 at. of the fuel gases and provided that the molar ratio of H2S/SO2 is 2:1, the reaction is quantitive.

d. That the installation for utilizing the procedure should operate under pressure 30 at. and at temperature of fuel gases up to 900° C.

The drying of the solid fuels e.g. lignites or peats as they are or after a deashing treatment with the fuels pulverized form, first with mechanical dewatering and then with heating to 180°–300° C. with exchange of the ash thermal energy received at 1.000° C. and of the thermal energy of the off-gases so that to be finally received as off gases at 180°–300° C.

The pyrolytic treatment starts with the solid fuel e.g lignite at temperature 180°–300°, while to be pyrolyzed, temperatures of 450° to 600° are needed. To form those temperatures the following thermal sources are used a) that of exchange on the gases of the oxidative gasification which are received at 1000° C. and can offer 200° C. to the pyrolysis mass (cooled down to 600° C.) and b) that of the thermal energy resulting from the exothermal pyrolytic reaction which will increase temperatures by 200° to 300° C.

With those thermal offers the pyrolytic treatment attains temperatures of 600° C. and higher. The energy coverage of the pyrolytic treatment is controlled by heating arrangements on the incoming lignite if needed, nevertheless, this is depending largely on the relative extent of the pyrolysis and of the oxidative gasification treatments.

The gasification of the carbon pyrolysis residue with oxygen or preferably with oxygen steam is added at 600° C. with high carbon purity and in porous stage proceeds very energetically with quantitative transformation of the contained carbon and rapid increase of the temperature to 900°–1000° C. The losses in thermal energy at the oxidative treatment are comparably low, lower than 12% and this refers to the 50% of total. The actual thermal energy loss is under 6% which is low for total gasification treatment and a high energy benefit.

The two streams of gasses the one from pyrolysis and the one from gasification with oxygen or with oxygen steam are mixed as they are received or after energy exchange utilization in a turbine. They are then directed to the Claus unit which operates under pressure. In the Claus unit the sulfur gases are neutralized and the fuel stream is received free of corrosive gases.

An analysis of gases produced in the two reactors that of pyrolysis and that of oxygen gasification for a number of greek lignites and peats are given in the following Table 2 as maxima and as minima of composition.

TABLE 2

| The composition of the gas fuels from pyrolysis and oxygen gasification | | |
|---|---|---|
| | From Pyrolysis, % | From Oxygen Gasification, % |
| Methane | 30–35% | Carbon monoxide |
| Carbon monoxide | 30–50% | 35–40% |
| Carbon dioxide | 2–6% | Carbon dioxide |
| Hydrogen | 16–22% | 16–22% |
| Hydrolgen Sulfide | 1–3% | Hydrogen 40–60% |
| | | Sulfur dioxide 1–2% |

The procedure of the pyrolytic reaction on a number of solid fuels of low thermal value gave the results of Table 3

TABLE 3

| The pyrolytic reaction of low caloric value lignites and peats in % (free of ash and in dry form) | | | | |
|---|---|---|---|---|
| temperature | Peat | Ptolemais (North Greece) | Megalopolis (Peloponessus, Greece) | Aliveri (Euboea, Greece) |
| 400° | 15.2% | 17.3% | 35.4% | 16.8% |
| 450° | 22.4 | 23.5 | 44.3 | 23.4 |
| 500° | 34.24 | 35.28 | 52.4 | 37.2 |
| 550° | 34.48 | 39.43 | 67.42 | 44.64 |
| 600° | 44.00 | 44.24 | 75.42 | 51.00 |
| 650° | 44.63 | 46.6 | 79.38 | 56.00 |
| Ash content | 11.55% | 10.8% | 20.6% | 11.5% |
| Kcal/Kg of the solid fuel | 4.400 | 5.100 | 4.400 | 5.400 |
| Kcal/Kg of the coal residue | 4.465 | 5.200 | 4.020 | 5.730 |

In the drawing, the utilization of the gases produced for electricity production are easily recognized as are the energy benefits obtained according to the present invention.

The production sequence consists of two pressure reactors in series that of pyrolysis and that of gasification with oxygen. The pyrolysis reactor is designed to operate at a temperature of 700° and pressure of 50 atm and is of fluidized bed type with automated systems for carbon feeding, and for withdrawing the products obtained: the carbon residue and the fuel gases.

The gasification reactor is designed to operate at temperatures up to 1200° and at pressures up to 50 atm and it is of solid bed type with automated systems for feeding and introducing oxygen and for releasing ash and the gases produced.

Another possibility for applying the present invention is a combination of the pyrolytic treatment with burning the carboneous residue in the existing boiler producing pressure steam.

According to this solution the solid fuels e.g. lignites or peats are introduced to the pyrolysis reactor with moisture up to 60% or in dry or semidried form and the fuel gases produced are fed to a turbine for utilization of their thermomechanical energy then are washed and the hydrogen sulfide present is neutralized by known procedures such as in a combination with the Stratford process. The fuel gases after this are burned to produce high amounts of electric energy in a combined-circle advanced system. The carbonareous residue in this case is burned in the existing boiler to produce pressure steam to run existing steam turbine or newly installed. With that solution the electric energy output is about three times higher than the one obtained today and the desulfurization covers the 70% of sulfur total presence in the solid fuel.

In the present invention it has been shown that the pyrolytic treatment is not influenced by the moisture of ash presence and that this treatment makes an energetic transformation pattern because the energy use is taken by the products produced, the gases and the carbon residue, and the steam formed actually increases substantially the gas volume and their energy content. Apart from utilizing the solid fuel optimized by biorefining release, the exothermic reaction is a substantial contribution in energy quantity and as energy source.

The fuel gases from the reactors are mixed and directed to a turbine to release part of the thermomechanical energy as electrical energy and then are introduced to a Claus reaction unit. In the Claus unit the gases for optimization should have a temperature of 400–450 and a working pressure. The thermomechanical energy can be also used in steam generation by thermal exchange.

At the end the fuel gases contain thermal energy up to 95%+ of thermal energy of the initial solid fuel in biorefining utilization and in exothermic reaction energy addition.

The fuel gases are fed into an advanced combined circle utilization for electric energy output. This, according to this invention, can exceed the 65% in combination of the turbine for thermomechanical energy utilization.

The yield in electrical energy today is 1.1 Kg of 3.000 Kcal lignite per KWh or with lignites and peats of thermal content 800–1200 Kcal/Kg the yield is 1.8–4.1 Kg/KW of electric energy. With the described invention the yield in electricity is impressively high, 0.41–0.62 Kg of lignite or peat/KWh since the lignites and the peats of low calorific content are utilized according to their energy content in dry form and additionally by the contribution of a sizable exothermic reaction which adds 20–30% in energy increase.

In view of the above, it can be appreciated that the present invention, in utilizing low caloric solid fuels with pyrolytic tendency of 30% to 80%, advances high yields in electricity production which is comparable to solid fuels of high thermal value and to oil, in an operation beneficially running entirely pollution free.

The present invention, therefore, introduces a procedure for electricity production of low cost from low calorific solid fuels which have a wide distribution in all the World in an operation which although it produces high amounts of electricity also introduces an operation running free of pollution from flying ash and from SO2 and can be arranged also to be free of nitric oxides, thus to be entirely pollution free. It also leads to a visable reduction of CO2 release of 75% per production unit.

After the description of the invention and the examples and the drawings which determine it, it is claimed:

1. A process for producing fuel gases from a solid fuel comprising carbonaceous material and having a calorific value of between about 800 to 3,000 Kcal/Kg, the process comprising:

a) pyrolyzing the solid fuel under reaction conditions and for a time sufficient to pyrolyze about 40–80% of the carbonaceous material whereby to form a first gas and a carbon residue without formation of tar; and b) gasifying the carbon residue by heating the carbon residue in the presence of oxygen or oxygen-steam; or burning the carbon residue.

2. A process for producing fuel gases as claimed in claim 1 wherein the solid fuel is lignite or peat.

3. A process for producing fuel gases as claimed in claim 2 wherein the solid fuel is pyrolyzed in a reductive reaction to form hydrogen sulfide in the first gas and the carbon residue is gasified in an oxidative reaction to form a second gas containing sulfur dioxide, and wherein the process further comprises mixing the first and second gases in respective amounts and under conditions sufficient substantially to neutralize the hydrogen sulfide and sulfur dioxide in the following reaction:

$$2H_2S + SO_2 \rightarrow 3S + 2H_2O$$

4. A process for producing fuel gases as claimed in claim 3 wherein the mixture of first and second gases is passed to a turbine or steam generator to produce electricity or pressure steam.

5. A process for producing fuel gases as claimed in claim 4 wherein the mixture of first and second gases is generated at a temperature between about 600°–800° C. with a pressure of between 20–30 atmospheres, the process comprising feeding the mixture of first and second gases to a turbine for use in producing electricity.

6. A process for producing fuel gases as claimed in claim 5 wherein the mixture of first and second gases is washed with water and is then fed in a combined circle arrangement to produce energy exceeding 50% of a thermal content of the mixture of gases.

7. A process for producing fuel gases as claimed in claim 2 wherein the solid fuel is pyrolyzed at a temperature of between about 450°–600° C. sufficiently to release energy in an amount about 250–600 Kcal/Kg of the lignite or peat.

8. A process for producing fuel gases as claimed in claim 7 wherein the carbon residue of step (a) is passed for gasification in step (b) at a temperature of between about 600°–900° C. in dry form and at sufficiently high purity and surface activity to enable gasification of the carbon residue with formation of temperatures of about 900°–1,100° C.

9. A process for producing fuel gases as claimed in claim 7 wherein the carbon residue of step (a) is burned to produce pressure steam.

10. A process for producing fuel gases as claimed in claim 8 wherein the solid fuel is pyrolyzed at a pyrolysis temperature between about 400°–600° C. and thermal energy for attaining said pyrolysis temperature is provided at least in part by heat exchange with gases produced in step (b) and by energy released during pyrolysis.

11. A process for producing fuel gases as claimed in claim 8 wherein the solid fuel is in pulverized form and is heated prior to step (a) by thermal energy exchange to a temperature of between about 180°–320° C. to effect a dewatering of the solid fuel by about 60–90%.

12. A process for producing fuel gases as claimed in claim 10 wherein the gasification in step (b) consumes only about 6% of carbon in the carbon residue and the process has a total thermal output of about 55 to 75% based on a thermal value of the solid fuel.

13. A process for producing fuel gases as claimed in claim 2 wherein the solid fuel contains moisture in an amount of up to 60% and the pyrolysis in step (a) effects a dewatering of the solid fuel.

14. A process for producing fuel gases as claimed in claim 2 wherein the first gas comprises:

| Methane | 20–35% |
|---|---|
| Carbon monoxide | 30–50% |
| Carbon dioxide | 2–6% |
| Hydrogen | 16–22% |
| Hydrogen Sulfide | 1–3% |

15. A process for producing fuel gases as claimed in claim 14 wherein the carbon residue is gasified in an oxidative reaction to form a second gas in step (b), the second gas comprising:

| Carbon monoxide | 35–40% |
|---|---|
| Carbon dioxide | 16–22% |
| Hydrogen | 40–60% |
| Sulfur dioxide | 1–2% |

16. A process for producing fuel gases as claimed in claim 15, wherein the first and second gases are mixed to form a gas mixture at a temperature between about 600°–800° C. and a pressure of between about 20–30 atmospheres the process comprising neutralizing hydrogen sulfide and sulfur dioxide in the respective first and second gases in the following reaction:

$$2H_2S + SO_2 \rightarrow 3S + H_2O$$

17. A process for producing fuel gases as claimed in claim 15 wherein said gas mixture contains thermomechanical energy that is used to drive a turbine.

18. A process for producing fuel gases as claimed in claim 17 wherein said gas mixture is also used as a fuel in a combined circle arrangement to produce electricity equivalent to about 55–75% of a thermal value of the solid fuel.

* * * * *

UNITED STATES PATENT AND TRADEMARK OFFICE
CERTIFICATE OF CORRECTION

PATENT NO. : 5,626,638
DATED : May 6, 1997
INVENTOR(S) : George N. VALKANAS

It is certified that error appears in the above-indentified patent and that said Letters Patent is hereby corrected as shown below:

ON TITLE PAGE, INSERT --[30] FOREIGN APPLICATION PRIORITY DATA JUNE 4, 1993 [GR] GREECE 930100227--.

Signed and Sealed this

Twenty-second Day of July, 1997

Attest:

BRUCE LEHMAN

Attesting Officer

Commissioner of Patents and Trademarks